United States Patent [19]

Ikeno

[11] Patent Number: 5,489,956
[45] Date of Patent: Feb. 6, 1996

[54] ACCESSIBLE LAMP FOR A CAMERA

[75] Inventor: Tomohisa Ikeno, Tokyo, Japan

[73] Assignee: Nikon Corporation, Tokyo, Japan

[21] Appl. No.: 354,791

[22] Filed: Dec. 12, 1994

[30]     Foreign Application Priority Data

Dec. 14, 1993 [JP] Japan .................................. 5-342081

[51] Int. Cl.⁶ .................................................. G03B 15/03
[52] U.S. Cl. ...................... 354/132; 354/149.11; 354/415
[58] Field of Search ..................................... 354/126, 132, 354/145.1, 149.11, 415

[56]               References Cited

U.S. PATENT DOCUMENTS

Re. 26,922  6/1970  Jakob et al. ........................... 354/126
4,317,625   3/1982  Van Allen ............................. 354/145
5,384,612   1/1995  Kaihara et al. ...................... 354/149.1

Primary Examiner—Michael L. Gellner
Assistant Examiner—Eddie C. Lee
Attorney, Agent, or Firm—Oliff & Berridge

[57]                ABSTRACT

To simplify the replacement of an auxiliary lamp installed in a lamp case inside a camera lamp, such as a built-in strobe, a modular quick-release assembly is used. A lamp case holds the auxiliary lamp and is installed within a holder as a unit coupled to a camera body. On the front end of this holder, a removable protective panel positioned in front of the auxiliary lamp is removably attached by a screw or elastic fastener. The lamp case is secured within the lamp by being held between the front end of the holder and the protective panel. Thus, replacement or repair can be accomplished by simply removing the protective panel from the holder and pulling out the lamp case that holds the auxiliary lamp.

28 Claims, 6 Drawing Sheets

ACCESSIBLE LAMP FOR A CAMERA

BACKGROUND OF THE INVENTION

1. Field of the Invention

The present invention relates to a camera lamp having an auxiliary lamp assembly for preventing the "red-eye phenomenon" applied to a strobe light emitting component used for flash photography on various cameras.

2. Description of Related Art

Figure 6:
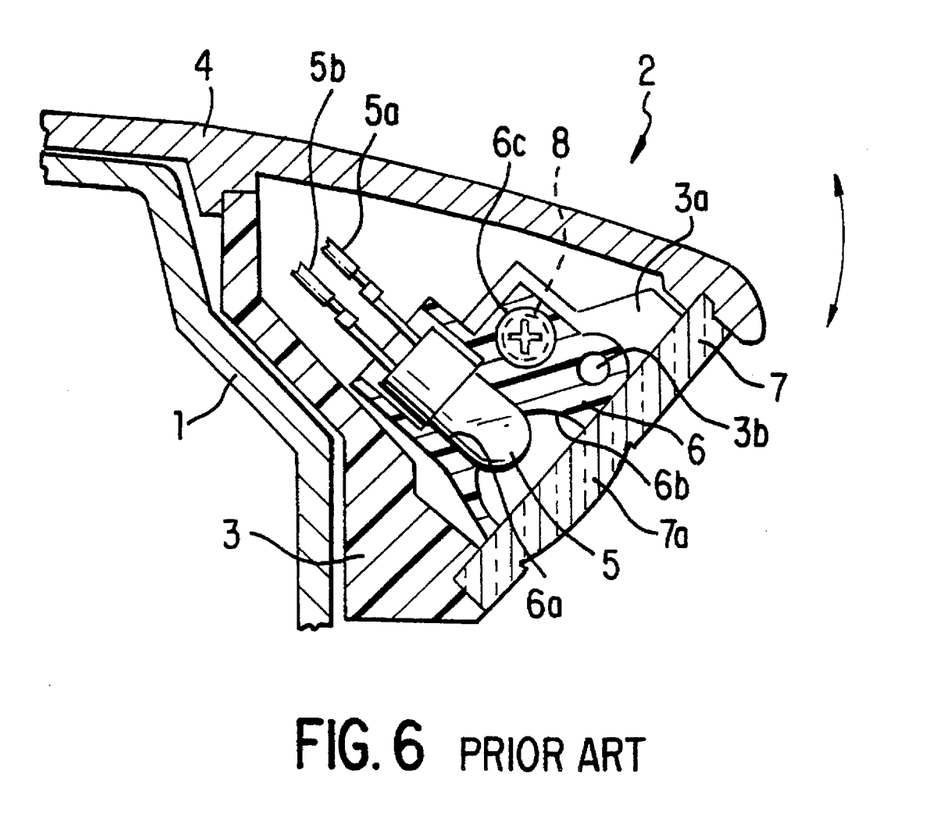
FIG. 6 is a simplified side view in cross section showing an example of a prior art lamp.

A conventional camera lamp is shown in FIG. 6, which is a partial cross section of a lamp 2 used as a strobe on a built-in strobe-type single-lens reflex camera. A top cover 1 of the main body of a camera is partially shown in the drawing. Lamp 2 is attached to the front surface of top cover 1 by a pivotal joint or other similar connection (not shown) in such a manner that it can be freely moved up or down as shown by the double headed arrow in FIG. 6. Lamp 2 can be switched between a flash photography ready position when it raised upwardly and a stored position, in which it is lowered into an indentation on the front side of top cover 1. FIG. 6 shows lamp 2 in the stored condition.

A holder 3 that forms the main body of lamp 2 is supported on a shaft (not shown) that allows holder 3 to rotate relative to top cover 1. A strobe cover 4 is affixed to the top side of holder 3 and encases the internal components of lamp 2, which includes a main lamp such as a xenon tube used as a strobe light emitting device with a reflecting umbrella that supports the xenon tube (not shown).

An auxiliary lamp 5 acts as an illumination mechanism that irradiates in advance of the strobe light emission to alleviate the "red eye phenomenon" known to occur in flash photography. Auxiliary lamp 5 is set into and held by a holding socket 6a of lamp case 6, which is fastened by a screw 8 to a partition 3a that is attached to the inside of holder 3.

A reflector 6b that reflects irradiated light from auxiliary lamp 5 is positioned in holding socket 6a of lamp case 6. Lead lines 5a and 5b connect auxiliary lamp 5 with a regulating circuit (not shown) as known.

A transparent protective panel 7 made of light permeable material is positioned as a protector at the front side of auxiliary lamp 5, which is used for the "red eye" alleviation. Transparent protective panel 7 also covers a xenon tube (not shown), which forms the main lamp embodied as a strobe light emitting component. The main lamp is held in the space formed by holder 3 and strobe cover 4. Protective panel 7 contains a lens portion 7a for focusing the irradiated light from auxiliary lamp 5.

With lamp 2 thus constructed, lamp case 6, which holds auxiliary lamp 5 for alleviating the "red eye phenomenon" is attached to holder 3, as described below Two holes are formed into an attachment piece 6c, which extends from a portion of lamp case 6. One of these holes connects with a protuberance 3b that protrudes from partition 3a of holder 3. Lamp case 6 is affixed to holder 3 by a screw 8 that passes through the other hole into partition 3a.

With prior art lamp 2 constructed as described above, auxiliary lamp 5 is small. As a result, depending on the conditions during photography, the filament of auxiliary lamp 5 may break easily. Hence, it is necessary to make auxiliary lamp 5 easily replaceable so that it may be serviced. To replace auxiliary lamp 5, strobe cover 4 must be removed from lamp 2 to expose holder 3. Then, screw 8 must be unfastened and lamp case 6 removed to gain access to auxiliary lamp 5.

However, strobe cover 4 described above cannot be removed from lamp 2 without being removed from the camera body. Thus, the operations of disassembly and reassembly require extensive labor and time.

SUMMARY OF THE INVENTION

In this regard, it is an object of the present invention to provide a lamp for a single-lens reflex camera with a built-in strobe in which the lamp, comprising a main lamp and an auxiliary lamp, in the interior of the camera may be accessed for service easily and quickly.

To satisfy this and other objects that will become apparent with this disclosure, the lamp for a camera according to this invention comprises a lamp case that holds an auxiliary lamp, a holder that holds the lamp case and is secured to the side of the camera body, and a light permeable protective panel positioned to cover the front surface side of the auxiliary lamp on the front end side of the holder. The lamp case is held in place by being pressed between the holder and the protective panel. The protective panel is removable and is fastened to the front end side of the holder component by a screw or by a fastener that utilizes elastic force.

According to the present invention, the lamp case can be removed from the device along with the auxiliary lamp, which is held by the lamp case, by removing the screw or fastening mechanism and removing the protective panel from the holder. Thus, the auxiliary lamp can be easily replaced or repaired.

BRIEF RESCRIPTION OF THE DRAWINGS

The invention will be described in conjunction with the following drawings in which like reference numerals designate like elements and wherein.

DETAILED DESCRIPTION OF PREFERRED EMBODIMENTS

An embodiment of the camera lamp according to the present invention is described hereafter, with reference to FIG. 1 through FIG. 4. In the figures, components that are identical or similar to components in FIG. 6 described above are labelled with the same reference numbers; hence, a detailed explanation is omitted.

Any suitable illumination mechanism, such as a lamp with a main strobe-type lamp and an auxiliary "red-eye" lamp, can be used in this invention. In the first embodiment, an example is shown in which lamp 102 has a built-in strobe.

Figure 3:
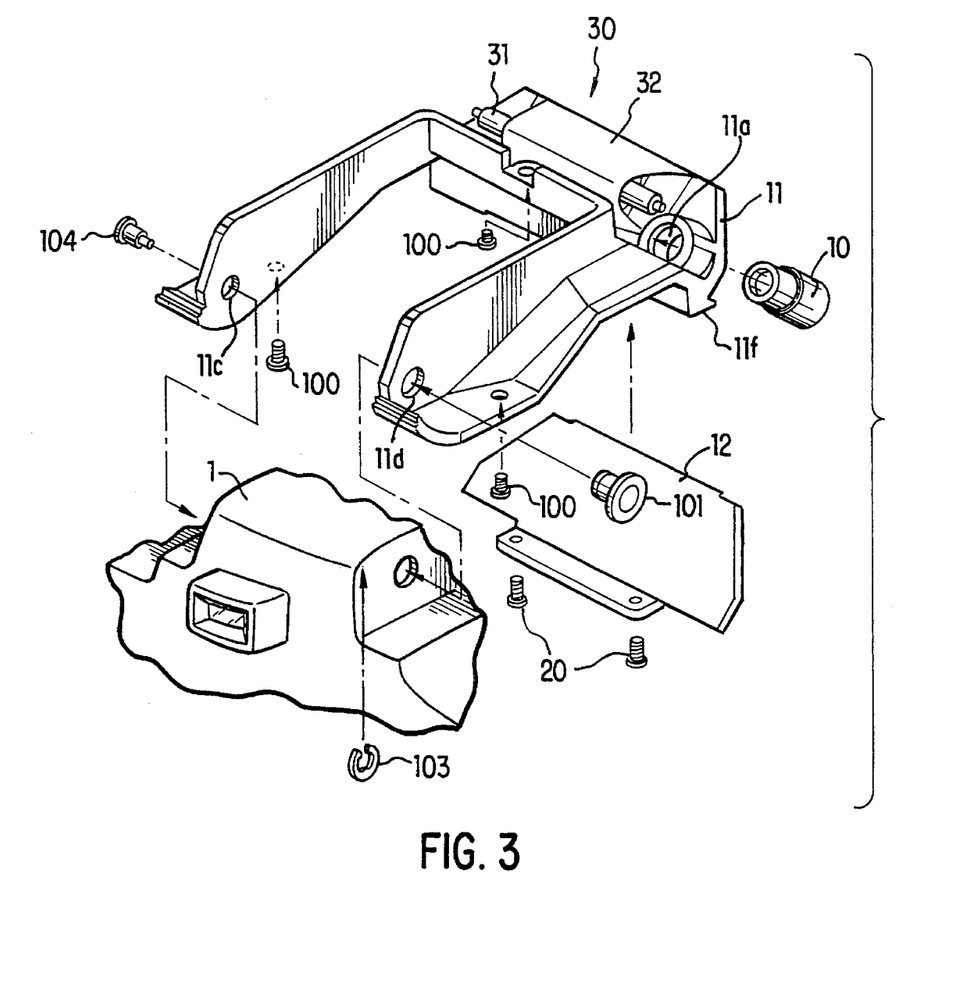
FIG. 3 is a partial exploded perspective view of the lamp of this invention.
Figure 4:
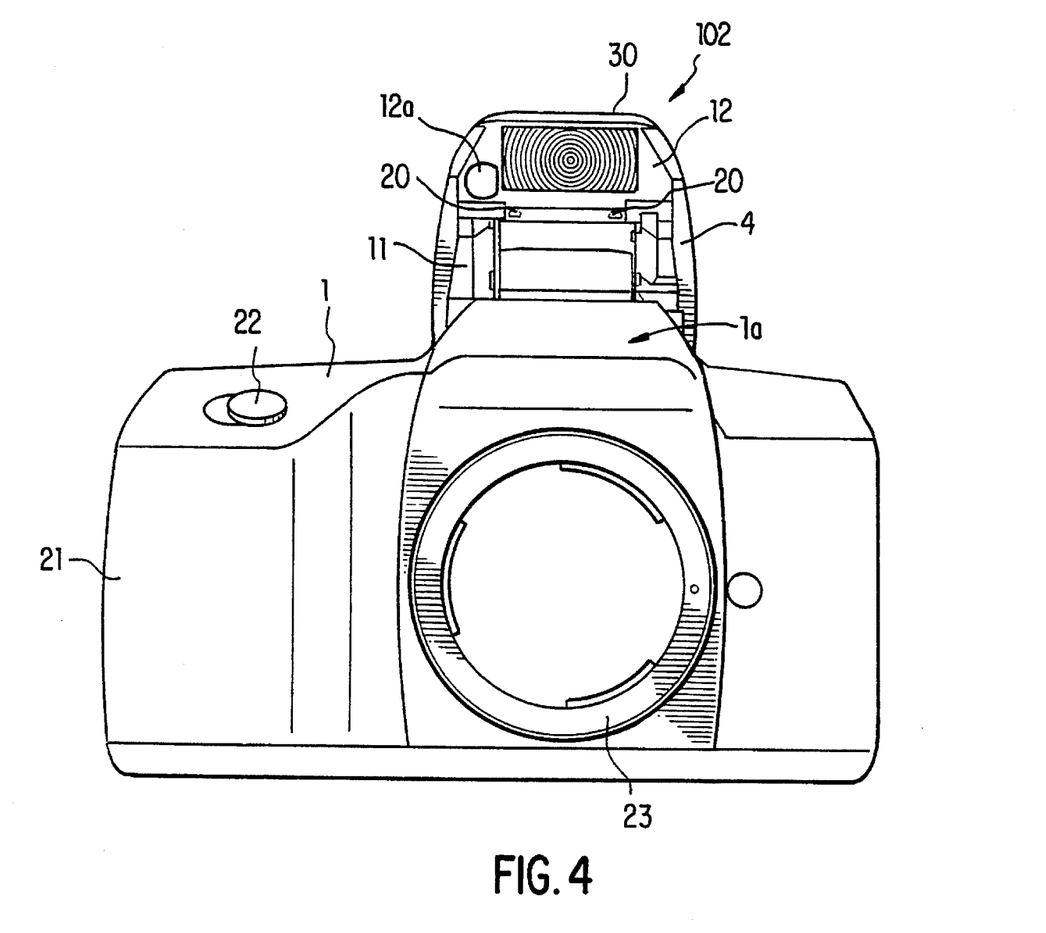
FIG. 4 is a simplified frontal view showing the present invention used on a suitable built-in strobe-type single-lens reflex camera.

As shown in FIGS. 3 and 4, lamp 102 is installed on the top end of a pentagonal prism portion 1a that bulges out from the center of a top cover 1 affixed to the top of a camera body 21 of a single-lens reflex camera. Lamp 102 can freely lift or retract Similar to lamp 2 described in FIG. 6. As seen in FIG. 4, lamp 102 has a protective panel 12 with a lens 12a.

Figure 1:
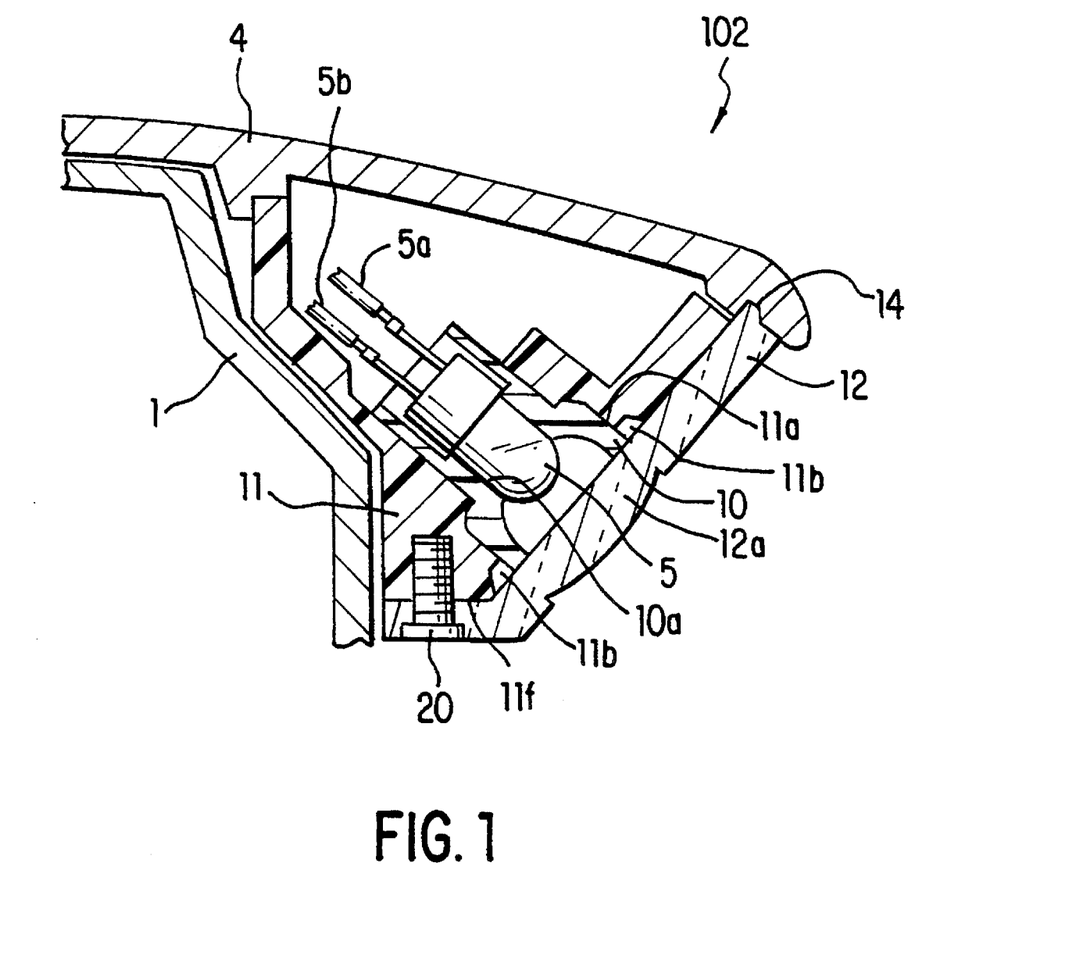
FIG. 1 shows a simplified side view in cross section of an embodiment of the lamp according to this invention in the case of a built-in strobe-type single-lens reflex camera.
Figure 2:
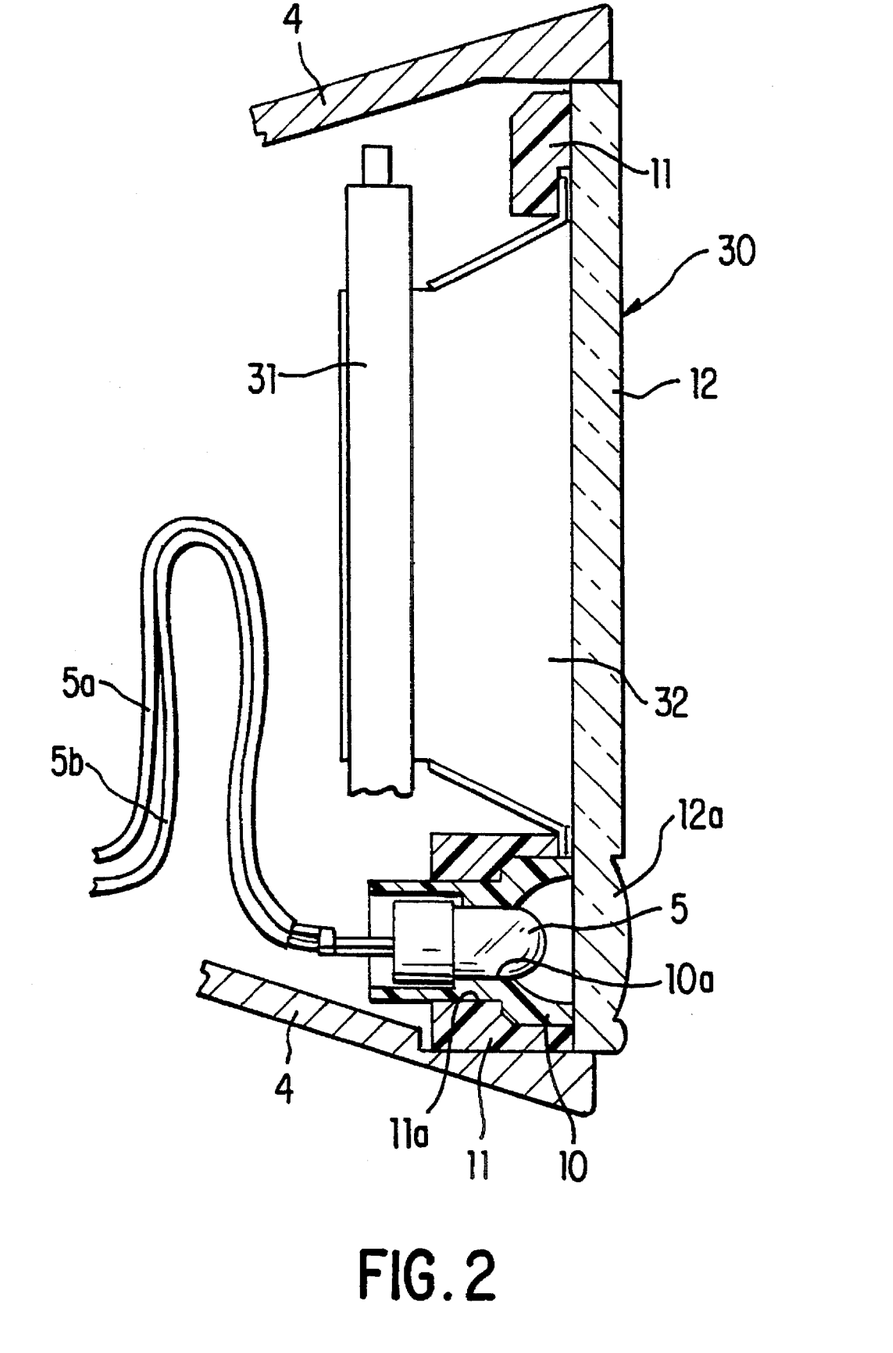
FIG. 2 is a partial top view in cross section of the lamp of FIG. 1.

Best seen in FIGS. 1–3, a holder 11 holds the light emitting portion of an auxiliary lamp 5. The light emitting portion of auxiliary lamp 5 is the portion that faces outwardly toward protective panel 12 behind lens 12a. Auxiliary lamp 5 emits light in advance of the flash from a strobe light emitting component 30 and the strobe light associated therewith, referred to in short as a strobe, to alleviate the known "red eye phenomenon." As seen in FIG. 3, holder 11 is rotatably supported by a pin 50 on top cover 1 of camera body 21. In addition, holder 11 holds strobe 30 and is covered by strobe cover 4 that overlaps top cover 1 of camera body 21. The front surface side of the interior space between holder 11 and strobe cover 4 is covered by protective panel 12, which is preferably a light permeable synthetic resin or other suitable transparent or translucent material.

In FIG. 4, lamp 102 is shown in the operating position, raised from the concave portion of top cover 1 so strobe 30 and auxiliary lamp 5 face outwardly. FIG. 1 shows lamp 102 in the retracted non-operating position.

A release operating button 22 and a bayonet mount 23 for the installation of a photo lens are located on camera body 21, as seen in FIG. 4. Other various known mechanisms, components, and operating means necessary on this type of camera are appropriately attached.

According to this invention, auxiliary lamp 5 and lamp case 10 operate to alleviate the "red eye phenomenon" by irradiating the object to be photographed prior to the flash of strobe 30. Holder 11 holding auxiliary lamp 5 installed in lamp case 10 is attached to strobe cover 4. Protective panel 12 is positioned to cover the front surface side of auxiliary lamp 5 at the front end of holder 11. Lamp case 10 is held by being pressed between holder 11 and removable protective panel 12, which is removably attached to the front end side of holder 11 by a screw 20, as shown in FIG. 1 through FIG. 4. In distinction from the prior art shown in FIG. 6, no fastener or other fastening mechanism secures lamp case 10 to holder 11. Thus, lamp case 10 is freely supported within holder 11 and is prevented from becoming detached therefrom by removable protective panel 12.

Lamp case 10 is formed with a barrel shape that has a larger diameter at one end. Holder 11 has a stepped socket 11a that mates with and receives lamp case 10, as shown in FIG. 1 through FIG. 3. Lamp case 10 is freely supported by stepped socket 11a without any additional fasteners. Auxiliary lamp 5 is installed into an interior holding socket 10a of lamp case 10.

Socket 11a has concave cut-out portions 11b formed in at least two places on the protective panel 12 side of the opening end of socket 11a on holder 11 to allow lamp case 10 to be gripped and removed from socket 11a when protective panel 12 is removed.

In addition, holder 11 has a flat surface 11f that faces downward when lamp 102 is in the stored position inside the concave portion of top cover 1. Protective cover 12 is formed so that the upper end of protective cover 12 connects with strobe cover 4 with a tongue and groove type connection 14 and the lower end contacts with flat surface 11f. Protective cover 12 is fastened by screws 20 to flat surface 11f of holder 11. Through this type of fastening with screws 20, the removal of lamp case 10, installed from the front side and held by socket 11a of holder 11, is controlled by protective panel 12.

As is made clear from FIG. 1 and FIG. 3, lamp case 10 along with auxiliary lamp 5, is removed from lamp 102 in a forward diagonal direction by removing screws 20 in the downward direction and then moving protective panel 12 in the downward direction to release the tongue and groove connection 14. Such removal is extremely easy, and a difficult and complex operation is not required to remove strobe cover 4, as in the prior art. This enables auxiliary lamp 5 to be easily and quickly replaced or repaired.

Lead lines 5a and 5b at the rear end of auxiliary lamp 5 described above, as seen in FIG. 2, are sufficiently long to allow auxiliary lamp 5 to be pulled out for replacement or repair. Further, an extra wire is stored inside holder 11 and strobe cover 4 for easy repair if needed. When replacing auxiliary lamp 5 as described above, lead lines 5a and 5b can be removed from auxiliary lamp 5 while lamp case 10 is in the withdrawn position and a separate modular lamp case 10 holding a new auxiliary lamp 5 can be connected to lines 5a and 5b.

Obviously, after lines 5a and 5b are connected, the replacement or repair is completed by inserting lamp case 10 into holding socket 11a of holder 11 and fastening protective panel 12 in place with screws 20.

The other components of the above-mentioned builtin strobe used as lamp 102 are constructed as shown in FIG. 2 and FIG. 3.

In simple terms, strobe 30 comprises a xenon tube 31 and a reflection umbrella 32 that supports xenon tube 31 and gathers and reflects light from the flash of xenon tube 31 to the object being photographed. Xenon tube 31 and reflection umbrella 32 are assembled as a single component positioned adjacent to holding socket 11a and are covered by protective panel 12.

As seen in FIG. 3, pin holes 11c and 11d in holder 11 accommodate screws 104 and 101, respectively, to pivotally secure lamp 102 to camera body 21. Preferably, an E-ring 103, seen used with screw 101, or other similar securement mechanism is used to achieve a rotatable connection. At least one of the screws, for example screw 101 as seen in FIG. 3, has a passage therethrough for electrical wiring. Alternatively, holder 11 can be secured by a snap-fit coupling arrangement. Strobe cover 4 is secured to holder 11 by screws 100.

with the present invention, protective panel 12 is formed as one piece with a portion of protective panel 12 positioned over strobe 30 and lens 12a positioned over auxiliary lamp 5, as seen in FIG. 4. Thus, the number of components of lamp 102 is kept to a minimum. Accordingly, the components are more easily processed, are more easily assembled, and are lower in cost. Finally, the entire lamp 102 can be constructed with a better overall appearance.

Figure 5:
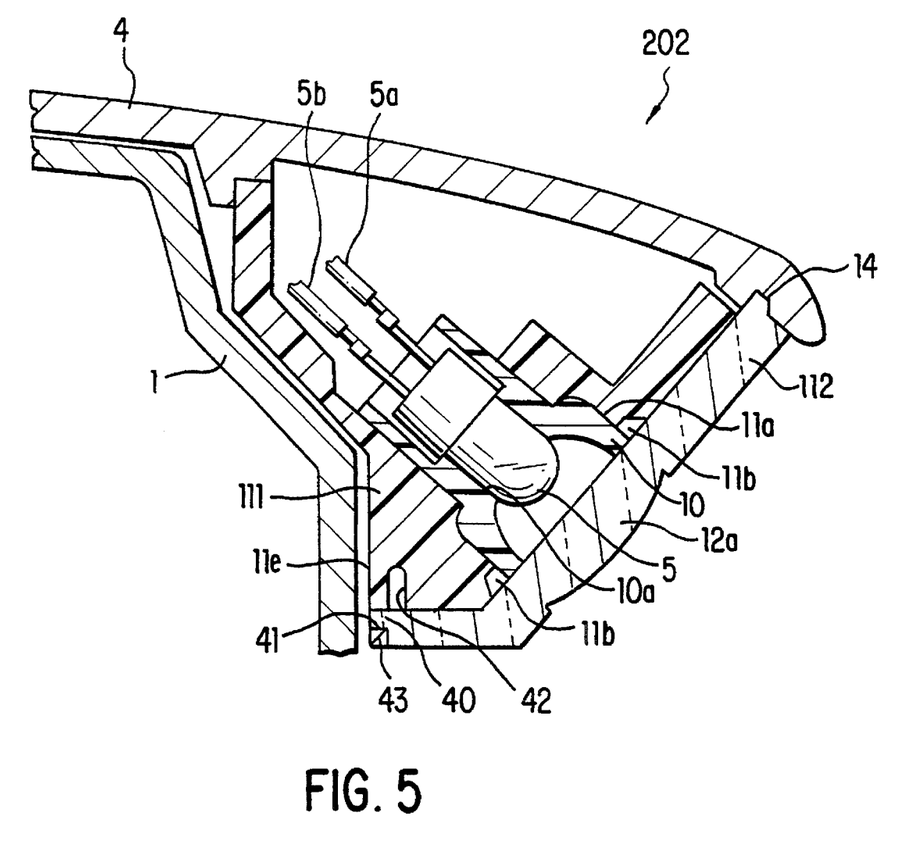
FIG. 5 is a simplified side view in cross section showing another embodiment of the lamp that relates to this invention.

FIG. 5 shows another embodiment of a lamp 202. With this embodiment, a portion of removable protective panel 112 is fastened to holder 111 by an elastic catch 40 that is used in place of screws 20 described above.

Elastic connecting catch 40 extends outwardly from an edge of protective panel 112. Catch 40 is freely removable and attachable to a connecting hole 41 formed in a partition 11e of holder 111. A slot 42 extends upwardly into holder 111 to form partition 11e as a flexible finger. Below connecting hole 41 is a ramp 43. Protective panel 112 is easily assembled by connecting tongue and groove connection 14 and snapping catch 40 into connecting hole 41 by sliding catch 40 up ramp 43. Similarly, catch 40 may be easily unfastened by bending partition 11e of holder 111 toward the left side as seen in FIG. 5 to allow catch 40 to be released from connecting hole 41 and slide down ramp 43.

With this type of construction, the outward appearance of illumination device 202 can be made more clean and attractive, and protective cover 112 can be quickly snapped in and out of place.

The present invention is not limited to the embodiments described above, and the shape, construction, etc. of each part that comprises lamps 102 and 202 may be modified or changed as appropriate.

For example, with the embodiments described above, transparent protective panels 12 and 112 are formed from a light permeable synthetic resin. However, the present invention is not limited to this application, and any type of light permeable material may be used.

In addition, the present invention is not limited to use with the built-in strobe-type single-lens reflex camera described in the embodiments above, but may also be applied with demonstrable effect to lamps such as a detachable strobe or any other illumination device on a suitable camera.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as derinca in the following claims.

What is claimed is:

1. A camera lamp comprising:
   a cover;
   a main lamp that illuminates a photographic subject during a photographic exposure disposed within the cover;
   an auxiliary lamp assembly that illuminates the photographic subject prior to illumination by the main lamp disposed within the cover adjacent to the main lamp, the auxiliary lamp assembly including a lamp case and an auxiliary light source held within the lamp case;
   a holder coupled to the cover that holds at least the auxiliary lamp, wherein the lamp case is freely held within the holder; and
   a light permeable protective panel removably coupled to the cover and the holder that covers at least the auxiliary lamp assembly, wherein the lamp case is secured in place by the protective panel and is removable from the holder when the protective panel is disassembled from the holder.

2. The camera lamp of claim 1 wherein the main lamp is a strobe-type lamp.

3. The camera lamp of claim 1 wherein the lamp case has an interior holding socket formed therein in which the auxiliary light source is held.

4. The camera lamp of claim 1 wherein the holder supports the main lamp.

5. The camera lamp of claim 1 wherein the holder has a stepped socket formed therein that receives the lamp case.

6. The camera lamp of claim 5 wherein the stepped socket flares outwardly toward the protective panel.

7. The camera lamp of claim 6 wherein the holder further has at least two cut-out portions formed therein adjacent to the stepped socket that allow the lamp case to be gripped when fully installed in the holder.

8. The camera lamp of claim 1 further comprising a fastener secured to the holder through the protective panel to hold the protective panel directly against the lamp case.

9. The camera Lamp of claim 1 further comprising a screw, wherein the protective panel has an aperture therein and the screw is fastened through the aperture to the holder.

10. The camera lamp of claim 1 wherein the protective panel has a catch extending therefrom and the holder has a flexible finger with an aperture therein that releasably engages the catch to secure the protective panel to the holder.

11. The camera lamp of claim 10 wherein the protective panel has an outer edge and the catch extends outwardly therefrom, and wherein the flexible finger is formed by a slot formed in the holder.

12. The camera lamp of claim 1 wherein the holder includes a connector that rotatably connects the lamp to a camera.

13. A lamp for use with a camera comprising:
    lamp means for illuminating a photographic subject comprising light means for generating illumination and lamp case means for supporting the light means;
    holder means for holding the lamp means including supporting means for freely supporting the lamp case means and coupling means for coupling the lamp to a camera; and
    protective means for covering and protecting the light means, the protective means being releasably secured to the holder means and preventing removal of the light means when secured to the holder means,
    wherein upon removal of the protective means from the holder means, the lamp case means and the light means are fully accessible for replacement and repair.

14. The lamp of claim 13 wherein the lamp means comprises a main lamp for illuminating a photographic subject during photographic exposure and an auxiliary lamp for illuminating the photographic subject prior to illumination by the main lamp, wherein the light means and the lamp case means form the auxiliary lamp.

15. The lamp of claim 14 wherein the main lamp is a strobe-type lamp.

16. The lamp of claim 13 wherein the supporting means is a stepped socket formed in the holder means that flares outwardly toward the protective means and the lamp case means has an outer stepped surface complementarily shaped with respect to the stepped socket, wherein the lamp case means is received in the stepped socket.

17. The lamp of claim 16 wherein the holder means further has at least two cut out portions formed therein adjacent to and communicating with the stepped socket that allow the lamp case means to be gripped when fully installed in the holder means.

18. The lamp of claim 13 wherein the lamp case means has an interior holding socket that receives the light means.

19. The lamp of claim 13 wherein the protective means comprises a light permeable panel.

20. The lamp of claim 19 wherein the light permeable panel abuts the lamp case means such that the lamp case means is held directly between the holder means and the light permeable panel.

21. The lamp of claim 13 further comprizing fastening means for removably fastening the protective means to the holder means.

22. The lamp of claim 21 wherein the fastening means comprises a screw and the protective means is a panel with an aperture therein that receives the screw.

23. The lamp of claim 13 wherein the holder means has a flexible extension thereon having a hole therein and the protective means comprises a panel having a catch thereon, wherein the catch removably engages the hole in the flexible extension of the holder means.

24. The lamp of claim 13 further comprising a cover means secured to the holder means and the protective means for encasing the lamp means.

25. A method of disassembling a lamp for use with a camera for service, wherein the lamp comprises a lamp assembly, including a light source that illuminates a photographic subject in an illumination direction and a lamp case holding the light source, the lamp assembly being supported by a holder and covered by a protective panel, the method comprising the steps of:

removing the protective panel from the lamp to expose and release the lamp assembly;

grasping the lamp case and pulling the lamp case outward in the illumination direction to remove the lamp assembly from the holder; and servicing the lamp assembly.

26. The method of claim 25 wherein the step of removing the protective panel includes unfastening the protective panel from the holder.

27. The method of claim 26 wherein the step of unfastening the protective panel from the holder includes unscrewing a fastener to release the protective panel.

28. The method of claim 26 wherein the step of unfastening the protective panel from the holder includes unsnapping a catch formed on an edge of the protective panel from a hole in the holder by bending a flexible finger formed on the holder to release the catch.

* * * * *